US011165701B1

(12) United States Patent
Ghule et al.

(10) Patent No.: US 11,165,701 B1
(45) Date of Patent: Nov. 2, 2021

(54) IPV6 FLOW LABEL FOR STATELESS HANDLING OF IPV4-FRAGMENTS-IN-IPV6

(71) Applicant: Juniper Networks, Inc., Sunnyvale, CA (US)

(72) Inventors: Ashish Suresh Ghule, Bangalore (IN); Jagadish Narasimha Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/836,240

(22) Filed: Mar. 31, 2020

(51) Int. Cl.
*H04L 12/749* (2013.01)
*H04L 29/06* (2006.01)
*H04L 12/851* (2013.01)
*H04L 29/12* (2006.01)

(52) U.S. Cl.
CPC ........ *H04L 45/741* (2013.01); *H04L 47/2441* (2013.01); *H04L 61/251* (2013.01); *H04L 63/0254* (2013.01); *H04L 63/1416* (2013.01); *H04L 63/1466* (2013.01); *H04L 69/166* (2013.01); *H04L 69/167* (2013.01)

(58) Field of Classification Search
None
See application file for complete search history.

(56) References Cited

U.S. PATENT DOCUMENTS 7,568,224 B1 * 7/2009 Jennings ............... H04L 63/126
713/161
10,887,231 B2 1/2021 Ghule et al.
2002/0196797 A1 12/2002 Battin
2004/0064688 A1 4/2004 Jacobs
2004/0088385 A1 5/2004 Blanchet et al.
2004/0107287 A1 6/2004 Ananda et al.
(Continued)

FOREIGN PATENT DOCUMENTS

CN 101933290 A 12/2010
CN 102067569 A 5/2011
(Continued)

OTHER PUBLICATIONS

X. Xu, H. Assarpour, S. Ma, D. Bernier, D. Dukes, S. Hegde, Y. Lee, Y. Fan, Encapsulating IP in UDP, draft-xu-intarea-ip-in-udp-09, Sep. 9 (Year: 2019).*
(Continued)

*Primary Examiner* — Christopher M Crutchfield
(74) *Attorney, Agent, or Firm* — Shumaker & Sieffert, P.A.

(57) ABSTRACT

A network device may receive, from a first network, a network packet of a first network packet type that encapsulates a fragment of a second network packet of a second network packet type, where the network packet is part of a flow of a plurality of network packets of the first network packet type that encapsulates fragments of the second network packet, and where the network packet includes a flow label that indicates a source port for the second network packet. The network device may perform an anti-spoof check on the fragment of the second network packet based at least in part on the source port for the second network packet that is indicated by the flow label of the network packet. The network device may, based on the fragment passing the anti-spoof check, forward the fragment of the second network packet to a second network.

16 Claims, 7 Drawing Sheets

(56) References Cited

U.S. PATENT DOCUMENTS

| | | | |
|---|---|---|---|
| 2006/0039379 | A1 | 2/2006 | Abe et al. |
| 2007/0195761 | A1 | 8/2007 | Tatar et al. |
| 2009/0110003 | A1 | 4/2009 | Julien et al. |
| 2009/0154348 | A1 | 6/2009 | Newman |
| 2010/0014459 | A1 | 1/2010 | Mir et al. |
| 2010/0046522 | A1 | 2/2010 | Tatsumi et al. |
| 2010/0165991 | A1 | 7/2010 | Veal et al. |
| 2011/0110374 | A1 | 5/2011 | Boucadair et al. |
| 2011/0261822 | A1 | 10/2011 | Battestilli et al. |
| 2012/0246637 | A1 | 9/2012 | Kreeger et al. |
| 2014/0307738 | A1 | 10/2014 | Chen et al. |
| 2015/0063166 | A1 | 3/2015 | Sif et al. |
| 2015/0201447 | A1 | 7/2015 | Li et al. |
| 2016/0050140 | A1 | 2/2016 | Chinni et al. |
| 2017/0324849 | A1 | 11/2017 | Pfister et al. |
| 2019/0356591 | A1* | 11/2019 | Ghule ............... H04L 12/4633 |
| 2021/0126863 | A1 | 4/2021 | Ghule et al. |

FOREIGN PATENT DOCUMENTS

| | | |
|---|---|---|
| CN | 103368853 A | 10/2013 |
| CN | 105900518 A | 8/2016 |

OTHER PUBLICATIONS

P. Savola, RFC 4459: MTU and Fragmentation Issues with In-the-Network Tunneling, pp. 1-14, (Year: 2006).*

Y. Cui, J. Wu, P. Wu, O. Vautrin, Y. Lee, RFC 7040—Public IPv4-over-IPv6 Access Network, p. 1-13, November (Year: 2013).*

Troan, et al., "Mapping of Address and Port with Encapsulation (MAP-E)," Internet Engineering Task Force (IETF), RFC 7597, Jul. 2015, 35pp.

Despres et al. "IPv4 Residual Deployment via IPv6—A Stateless Solution (4rd)," Internet Engineering Task Force (IETF), RFC 7600, Jul. 2015, 45 pp.

U.S. Appl. No. 15/983,457, filed May 18, 2018, Juniper Networks, Inc. (inventor: Ghule), entitled "Packet Fragment Forwarding Without Reassembly".

U.S. Appl. No. 16/682,882, filed Nov. 13, 2019, Juniper Networks, Inc. (inventor: Ghule et al.) entitled "Anti-Spoof Check of IPV4-IN-IPV6 Fragments Without Reassembly".

Ziemba et al., "Security Considerations for IP Fragment Filtering," Network Working Group: RFC 1858, Oct. 1995, 10 pp.

Amante et al., "IPv6 Flow Label Specification," Internet Engineering Task Force (IETF), RFC 6437, Nov. 2011, 15 pp.

Carpenter et al., "Using the IPv6 Flow Label for Equal Cost Multipath Routing and Link Aggregation in Tunnels," Internet Engineering Task Force (IETF), RFC 6438, Nov. 2011, 9 pp.

U.S. Appl. No. 16/947,141, filed Jul. 20, 2020, Juniper Networks, Inc. (inventor: Ghule et al.) entitled "IPV6 Extension Header for Stateless Handling of Fragments in IPV6".

* cited by examiner

502 — RECEIVE, FROM A FIRST NETWORK, A NETWORK PACKET OF A FIRST NETWORK PACKET TYPE THAT ENCAPSULATES A FRAGMENT OF A SECOND NETWORK PACKET OF A SECOND NETWORK PACKET TYPE, WHEREIN THE NETWORK PACKET IS PART OF A FLOW OF A PLURALITY OF NETWORK PACKETS OF THE FIRST NETWORK PACKET TYPE THAT ENCAPSULATES FRAGMENTS OF THE SECOND NETWORK PACKET, AND WHEREIN THE NETWORK PACKET INCLUDES A FLOW LABEL THAT INDICATES A SOURCE PORT FOR THE NETWORK PACKET

504 — IN RESPONSE TO RECEIVING THE NETWORK PACKET, PERFORM AN ANTI-SPOOF CHECK ON THE FRAGMENT OF THE SECOND NETWORK PACKET BASED AT LEAST IN PART ON THE SOURCE PORT FOR THE SECOND NETWORK PACKET THAT IS INDICATED BY THE FLOW LABEL OF THE NETWORK PACKET

506 — BASED ON THE FRAGMENT OF THE SECOND NETWORK PACKET PASSING THE ANTI-SPOOF CHECK, FORWARD THE FRAGMENT OF THE SECOND NETWORK PACKET TO A SECOND NETWORK

FIG. 5

IPV6 FLOW LABEL FOR STATELESS HANDLING OF IPV4-FRAGMENTS-IN-IPV6

TECHNICAL FIELD

The disclosure relates to packet-based computer networks and, more particularly, to processing packets within network devices.

BACKGROUND

Internet Protocol version 6 (IPv6) is the successor to Internet Protocol version 4 (IPv4), both of which are versions of the Internet Protocol used for sending and receiving data via networks such as the Internet. IPv6 addresses potential issues with IPv4, such as address exhaustion. Networks have begun to transition from IPv4 to IPv6, and IPv6 networks are being deployed alongside IPv4 networks. One example mechanism for facilitating the transition from IPv4 to IPv6 is Mapping of Address and Port with Encapsulation (MAP-E). MAP-E is a mechanism for transporting IPv4 network packets across an IPv6 network using Internet Protocol (IP) encapsulation to encapsulate IPv4 network packets within IPv6 network packets.

SUMMARY

This disclosure describes techniques for a network device (e.g., a border relay device) to receive, from edge devices via an IPv6 network, IPv6 network packets that encapsulate fragments of an IPv4 network packet and to perform a stateless anti-spoofing check of the fragments of the IPv4 network packet before forwarding the fragments of the IPv4 network packet to an IPv4 network. In particular, aspects of this disclosure describe techniques for perform an anti-spoofing check of the fragments of the IPv4 network packet without reassembling IPv4 network packets from fragments and without buffering the IPv4 network packets. A network device may perform such an anti-spoof check by determining whether the source network address and the source port specified by the IPv4 network packet encapsulated within the IPv6 network packet fall within an acceptable range of values.

However, because each IPv6 network packet includes a different fragment of the IPv4 network packet, typically only a single IPv6 network packet may include the IPv4 network packet fragment having a transport header that specifies information such as the source port for the IPv4 network packet and the destination port for the IPv4 network packet. As such, a network device may receive one or more IPv6 network packets that do not contain the IPv4 network packet fragment that specifies the source port for the IPv4 network packet before it receives the IPv6 network packet that contains the IPv4 network packet fragment that specifies the source port for the IPv4 network packet.

The network device may therefore have to buffer IPv4 network packet fragments that do not specify the source port for the IPv4 network packet until the network device receives an IPv6 network packet that contains the IPv4 network packet fragment that specifies the source port specified by the IPv4 network packet. A network device that performs such buffering of IPv4 network fragments may have to utilize additional memory resources to buffer the IPv4 network fragments and may also have to utilize additional processing resources to keep track of fragments of different IPv4 network packets that it is buffering. For example, the network device may have to keep track of whether, for a flow of fragments of an IPv4 network packet, whether the network device has received a fragment that indicates the source port for the IPv4 network packet.

In accordance with aspects of this disclosure, an edge device that fragments an IPv4 network packet, encapsulates the IPv4 network packet fragments in IPv6 network packets, and sends the IPv6 network packets to the network device may add an indication of the source port specified by the IPv4 network packet in each of the IPv6 network packets that encapsulates a fragment of the IPv4 network packet. In particular, the edge device may generate a flow label for fragments of the same IPv4 network packet that indicates the source port specified by the IPv4 network packet, and may include the same flow label in each of the IPv6 network packets that encapsulate fragments of the same IPv4 network packet. In this way, each IPv4 network packet fragment may include a flow label that indicates the source port specified by the IPv4 network packet. In some examples, instead of or besides indicating the source port specified by the IPv4 network packet, the edge device may generate a flow label that may indicate other information or parameters of the IPv4 network packet that is only included in a single one of the fragments of an IPv4 network packet, such as the destination port for the IPv4 network packet that is specified by the transport header of the IPv4 network packet.

Because the flow label in the encapsulating IPv6 header for each IPv4-fragment-in-IPv6 encodes the source port, the network device may be able to decapsulate and perform an anti-spoof check on each inner IPv4 network packet fragment it receives from the edge device without having to buffer such IPv4 network packet fragments until the network device receives the IPv6 network packet that contains the IPv4 network packet fragment that specifies the source port for the IPv4 network packet. In this way, the techniques described in this disclosure enables a network device to perform stateless handling of IPv4 network packet fragments by enabling the network device to refrain from having to track, for an IPv4 network packet, whether it has already received a fragment of the IPv4 network packet that indicates the source port for the IPv4 network packet.

The techniques described herein may provide certain advantages. For example, the techniques described herein may allow a network device to avoid reassembling the entire IPv4 network packet from the fragments of the IPv4 network packet in order to perform an anti-spoof check on the network packet. Because performing reassembly of IPv4 network packets uses processor and memory resources, refraining from reassembling the IPv4 network packet from the fragments of the IPv4 network packet may enable the network device to perform anti-spoof checks on IPv4 network packets in a way that uses fewer processor and memory resources. This improves the performance of the network device in performing anti-spoof checks on IPv4 network packets, by enabling the network device to increase the speed at which it performs anti-spoof checks on IPv4 network packets while expending less processing resources and using less memory resources to perform such anti-spoof checks.

Similarly, the techniques described herein also allow a network device to avoid buffering fragments of an IPv4 network packet until the network device receives a fragment of the IPv4 network packet that includes information for the network device to perform an anti-spoof check on the IPv4 network packet. Because buffering fragments of an IPv4 network packet and keeping track of the fragments of an IPv4 network packet buffered at the network device may consume processor and memory resources, the techniques described herein that allow the network device to avoid buffering fragments of an IPv4 network packet may also enable the network device to perform anti-spoof checks on IPv4 network packets in a way that uses fewer processor and memory resources.

In one example, a method includes receiving, by a network device from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that indicates a source port for the network packet. The method further includes in response to receiving the network packet, performing, by the network device, an anti-spoof check on the fragment of the second network packet based at least in part on the source port for the second network packet that is indicated by the flow label of the network packet. The method further includes based on the fragment of the second network packet passing the anti-spoof check, forwarding, by the network device, the fragment of the second network packet to a second network.

In another example, a network device includes one or more network interfaces configured to receive, from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that indicates a source port for the network packet.

The network device further includes processing circuitry configured to: in response to receiving the network packet, perform an anti-spoof check on the fragment of the second network packet based at least in part on the source port for the second network packet that is indicated by the flow label of the network packet, where the one or more network interfaces are further configured to, based on the fragment of the second network packet passing the anti-spoof check, forward the fragment of the second network packet to a second network.

In another example, a method includes receiving, by a network device from a second network, a network packet of a second network packet type. The method further includes fragmenting, by the network device, the network packet into a plurality of fragments of the network packet. The method further includes encapsulating, by the network device, the plurality of fragments of the network packet with a plurality of network packets of a first network packet type, including creating, for each of the plurality of network packets, a flow label that indicates a source port of the network packet. The method further includes forwarding, by the network device, the plurality of network packets to a first network.

In another example, a network device includes one or more network interfaces configured to receive, from a second network, a network packet of a second network packet type. The network device further includes processing circuitry configured to: fragment the network packet into a plurality of fragments of the network packet and encapsulate the plurality of fragments of the network packet with a plurality of network packets of a first network packet type, including creating, for each of the plurality of network packets, a flow label that indicates a source port of the network packet, where the one or more network interfaces are further configured to forward the plurality of network packets to a first network.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a flowchart illustrating an example process for performing an anti-spoof check on fragments of an IPv4 network packet without buffering fragments of the IPv4 network packet and without reassembling the IPv4 network packet, according to techniques described herein.

DETAILED DESCRIPTION

Figure 1:
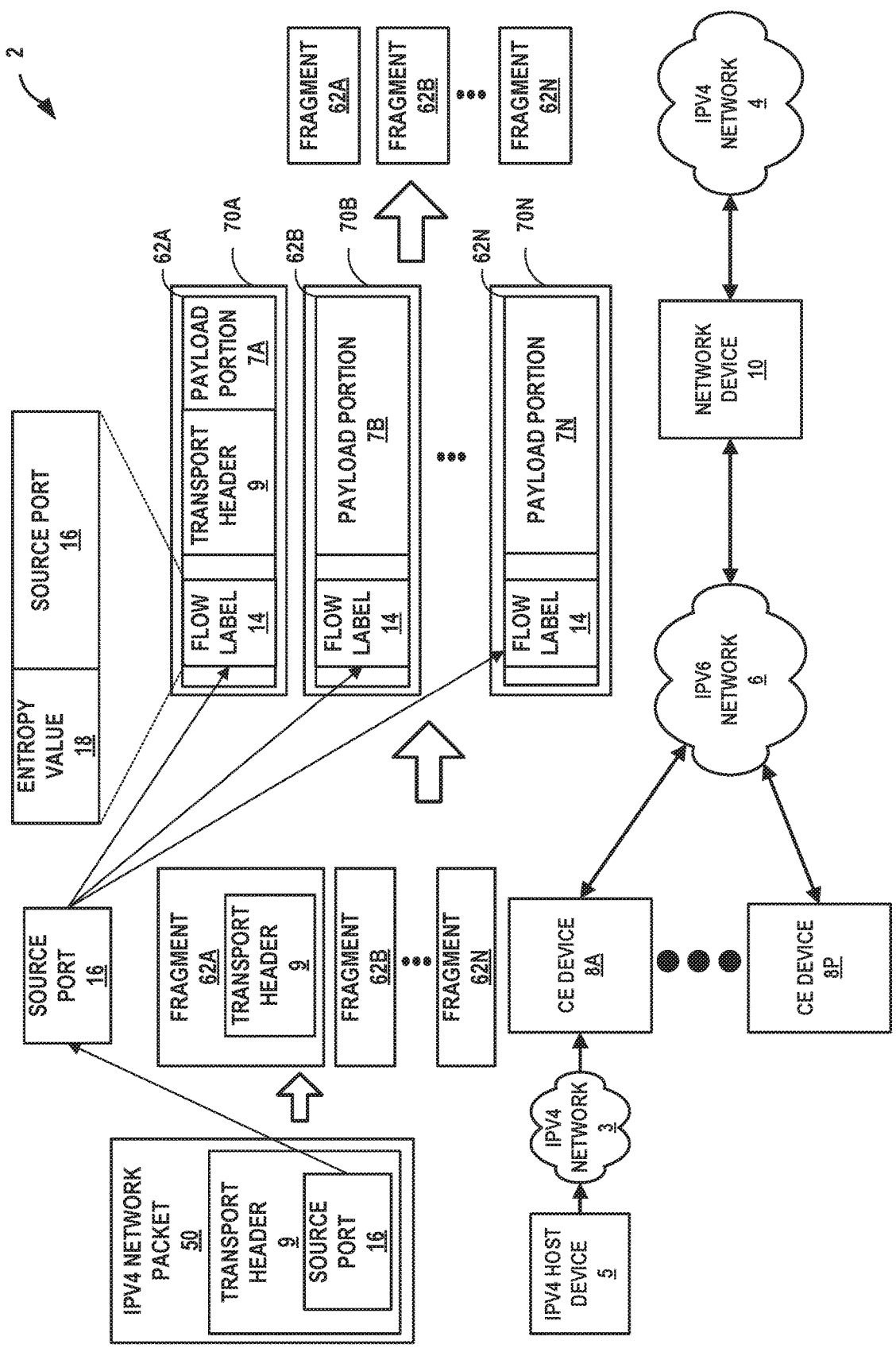
FIG. 1 is a block diagram illustrating a system in which a network device may connect an IPv6 network to an IPv4 network, according to aspects of the present disclosure.

FIG. 1 is a block diagram illustrating a system 2 in which a network device 10 may connect an IPv6 network 6 to an IPv4 network 4, according to aspects of the present disclosure. Network device 10 may be, for example, a MAP-E enabled router, such as a MAP border relay device that managed by a service provider at the edge of a MAP domain, having at least one IPv6 enabled interface connecting network device 10 to IPv6 network 6, and at least one IPv4 interface connecting network device to IPv4 network 4. In some examples, some or all of system 2 may be part of a service provider network (not shown).

As shown in FIG. 1, one of consumer or customer edge (CE) devices 8A-8P ("CE devices 8"), such as a customer edge router, may receive, via a private IPv4 network such as IPv4 network 3, an IPv4 network packet 50 from any suitable computing device connected to IPV4 network 3, such as IPv4 host device 5, that is to be forwarded to a public IPv4 network such as IPv4 network 4.

CE devices 8 may connect to IPv4 network 4 via IPv6 network 6 and network device 10 that may be a border relay device for forwarding network packets to IPv4 network 4. As such, in order to forward IPv4 network packet 50 to IPv4 network 4, CE device 8 may have to transmit the IPv4 network packet 50 via IPv6 network 6 to network device 10 by encapsulating an IPv4 network packet 50 within an IPv6 network packet. If the resulting IPv6 network packet from encapsulates IPv4 network packet 50 is larger than a maximum transmission unit (MTU) for IPv6 network 6, CE device 8A, may fragment the IPv4 network packet 50 into fragments 62A-62N, encapsulate the fragments 62A-62N in respective IPv6 network packets 70A-70N, and transmit the IPv6 network packets 70A-70N via IPv6 network 6 to network device 10.

As mentioned throughout this disclosure, the fragments of an IPv4 network packet may make up a fragment flow for the IPv4 network packet. In the example of FIG. 1, fragments 62A-62N may be a part of a fragment flow for IPv4 network packet 50. Network device 10 may receive, from CE device 8A via IPv6 network 6, the IPv6 network packets 70A-70N containing fragments 62A-62N. Network device 10 may decapsulate fragments 62A-62N from IPv6 network packets 70A-70N and may forward the fragments 62A-62N of IPv4 network packet 50 to IPv4 network 4.

To prevent spoofing of IPv4 addresses, network device 10 may perform an anti-spoof check on each fragment of fragments 62A-62N it receives. If fragments 62A-62N pass the anti-spoofing checks, forward fragments 62A-62N to IPv4 network 4. Conversely, if fragments 62A-62N do not pass the anti-spoofing check, network device 10 may drop fragments 62A-62N or may otherwise refrain from forwarding fragments 62A-62N to IPv4 network 4.

Network device 10 may perform the anti-spoof check of each fragment of fragments 62A-62N based at least in part on the source network address and the source port specified by the IPv4 network packet 50 encapsulated in IPv6 network packets 70A-70N, which is contained in the transport header 9 of the IPv4 network packet 50. As shown in FIG. 1, IPv4 network packet 50 may include or be associated with transport header 9, also referred to as a transport protocol header, such as a Transport Control Protocol (TCP) header, a User Diagram Protocol (UDP) header, and the like. Transport header 9 may specify source port 16 for IPv4 network packet 50. However, not every fragment of fragments 62A-62N may include the portion of transport header of the IPv4 network packet 50 that specifies source port 16 for the IPv4 network packet 50. Rather, only a single fragment of fragments 62A-62N, such as fragment 62A, may include transport header 9 that specifies source port 16 for the IPv4 network packet 50.

As shown in FIG. 1, each fragment of fragments 62A-62N may include a different non-overlapping portion of the payload of IPv4 network packet 50. For example, fragment 62A may include IPv4 network packet payload portion 7A, fragment 62B may include and IPv4 network packet payload portion 7B, and fragment 62N may include and IPv4 network packet payload portion 7N. However, only one fragment out of fragments 62A-62N may include the transport header 9 of IPv4 network packet 50. As shown in FIG. 1, fragment 62A is the only fragment out of fragments 62A-62N that also includes transport header 9, which specifies source port 16 for IPv4 network packet 50 that network device 10 may use to perform the anti-spoof check on fragments 62A-62N.

As such, if network device 10 receives one or more fragments 62 of network packet 50 that do not include transport header 9, network device 10 might not be able to perform anti-spoof checks on the received one or more fragments 62 of IPv4 network packet 50 at least until network device 10 receives a fragment of network packet 50 that includes transport header 9. In one example, in order for network device 10 to perform anti-spoof checks on each fragment of fragments 62A-62N, network device 10 may receive every fragment of fragments 62A-62N and may buffer each of the fragments 62A-62N that it receives. When network device 10 has received every fragment of fragments 62, thereby ensuring that network device 10 has received transport header 9 of IPv4 network packet 50, network device 10 may reassemble IPv4 network packet 50 from fragments 62A-62N and perform an anti-spoof check on the reassembled IPv4 network packet 50 based at least in part on source port 16 specified by transport header 9.

In another example, in order for network device 10 to perform anti-spoof checks on each fragment of fragments 62A-62N, network device 10 may receive and buffer fragments of fragments 62A-62N until it receives a fragment of fragments 62A-62N that includes transport header 9. Once network device 10 receives a fragment of fragments 62A-62N that includes transport header 9, network device 10 may be able to perform anti-spoof checks on the fragments of fragments 62A-62N buffered by network device 10 as well as all other fragments of fragments 62A-62N that network device 10 subsequently receives without reassembling IPv4 network packet 50.

However, buffering fragments 62A-62N may increase use of network device 10's processing and memory resources in order for network device 10 to buffer fragments 62 and to keep track of such buffered fragments. Accordingly, the techniques described herein may enable network device 10 to avoid buffering multiple fragments of an IPv4 network packet in order to perform anti-spoof checks on IPv4 network packets, thereby enabling network device 10 to use fewer processing and memory resources. This improves the performance of the network device 10 in perform anti-spoof checks on IPv4 network packets by enabling the network device 10 to increase the speed at which it performs anti-spoof checks on IPv4 network packets while consuming fewer processing cycles and using fewer memory resources to perform such anti-spoof checks.

In accordance with some aspects of the present disclosure, a CE device, such as CE device 8A, that fragments IPv4 network packet 50 into fragments 62A-62N and encapsulates fragments 62A-62N into IPv6 network packets 70A-70N may create IPv6 network packets 70A-70N so that IPv6 network packets 70A-70N includes an indication of source port 16 for IPv4 network packet 50. In this way, each time network device 10 receives one of IPv6 network packets 70A-70N that encapsulates an IPv4 network packet 50, network device 10 may be able to perform an anti-spoof check of a fragment of IPv4 network packet 50 encapsulated by the received IPv6 network packet regardless of whether the fragment of IPv4 network packet 50 includes transport header 9 and regardless of whether network device 10 had previously received any fragments of IPv4 network packet 50 that includes transport header 9.

A flow is a sequence of related packets sent from a particular source to a particular destination. To identify that packets are in the same flow, each packet in the same flow may carry a flow label that is the same for every packet in the same flow. Further, flow labels of packets in different flows may have different values in order to differentiate between packets in different flows. In the example of FIG. 1, IPv6 network packets 70A-70N sent from CE device 8A to network device 10 are part of a flow because IPv6 network packets 70A-70N are a sequence of packets that carry fragments 62A-62N of the same IPv4 network packet 50. In order to identify each of IPv6 network packets 70A-70N as being part of the same flow, packets 70A-70N may each include flow label 14 that is the same for each of packets 70A-70N.

Because each of IPv6 network packets 70A-70N includes flow label 14 that identifiers each of IPv6 network packets 70A-70N as being part of the same flow of network packets, and because flow label 14 is the same for each of IPv6 network packets 70A-70N that belong in the same flow, CE device 8A may include an indication of source port 16 for IPv4 network packet 50 in each of IPv6 network packets 70A-70N by including an indication of source port 16 in flow label 14 that is included in each of IPv6 network packets 70A-70N. To prevent two unrelated flows of network packets from having the same flow label, such as two unrelated flows of IPv6 network packets that encapsulate fragments of IPv4 network packets having the same source port, CE device 8A may include entropy value 18 in flow label 14 of IPv6 network packets 70A-70N along with an indication of source port 16, where entropy value 18 may be a bitwise representation of a random number that is determined by CE device 8A. In some examples, instead or in addition to an indication of source port 16, CE device 8A may also include, in flow label 14, indications of other parameters or information that may be specified by a single fragment of fragments 62A-62N. For example, transport header 9 of IPv4 network packet 50 may also include a destination port for IPv4 network packet 50. As such, in some examples, CE device 8A may also include, in flow label 14, an indication of the destination port for IPv4 network packet 50 specified by transport header 9.

In some examples, flow label 14 may be a 20-bit field, and source port 16 may be a 16-bit value. As such, CE device 8A may create flow label 14 that includes the 16-bit value of source port 16 as well as 4 bits of entropy value 18. In some examples, CE device 8A may create flow label 14 that includes source port 16 as the sixteen most significant bits of flow label 14 and entropy value 18 as the four least significant bits of flow label 14, while in other examples CE device 8A may create flow label 14 that includes source port 16 as the sixteen least significant bits of flow label 14 and entropy value 18 as the four most significant bits of flow label 14. CE device 8A may also arrange source port 16 and entropy value 18 in any other fashion in the 20-bit flow label 14, such as by interleaving the bits of source port 16 with entropy value 18 in any appropriate fashion. For example, CE device 8A may create flow label 14 where the most significant two bits of entropy value 18 are the two most significant bits of flow label 14, followed by sixteen bits of source port 16, followed by the two least significant bits of entropy value 18 as the two least significant bits of flow label 14.

In some examples, CE device 8A may encrypt or otherwise obfuscate the value of source port 16 included in flow label 14. For example, CE device 8A may encrypt source port 16 via any suitable encryption techniques to result in an encrypted source port that CE device 8A may include in flow label 14. In some examples, to encrypt or to obfuscate the value of source port 16, CE device 8A may perform one's complement or two's complement on the value of source port 16 and may include the resulting value of source port 16 in flow label 14 along with entropy value 18.

CE device 8A may send IPv6 network packets 70 that encapsulate fragments 62 of IPv4 network packet 50 via IPv6 network 6 to network device 10, where each IPv6 network packet of IPv6 network packets 70 includes flow label 14. As described above, flow label 14 in each of IPv6 network packets 70 includes an indication of source port 16 for IPv4 network packet and entropy value 18. Network device 10 may receive IPv6 network packets 70 sent from CE device 8A in any order, such that the first IPv6 network packet of IPv6 network packets 70 that network device 10 receives might not necessarily contain transport header 9 of IPv4 network packet 50. Nevertheless, because each of IPv6 network packets sent from CE device 8A and received by network device 10 includes flow label 14 that includes an indication of source port 16 of IPv4 network packet 50, network device 10 may be able to perform an anti-spoof check on each IPv6 network packet of IPv6 network packets 70 that it receives regardless of whether the IPv6 network packet of IPv6 network packets 70 that it receives includes transport header 9 of IPv4 network packet 50.

Network device 10 may receive an IPv6 network packet (e.g., IPv6 network packet 70B) of IPv6 network packets 70. Network device 10 may, in response to receiving the IPv6 network packet, decapsulate the fragment (e.g., fragment 62B) of IPv4 network packet 50 encapsulated in the IPv6 network packet and perform an anti-spoof check of the fragment (e.g., fragment 62B) of IPv4 network packet 50 encapsulated in the IPv6 network packet based at least in part on source port 16 for IPv4 network packet 50 that is indicated by flow label 14 of the received IPv6 network packet. Because each of IPv6 network packet 70 includes flow label 14 that indicates source port 16 for IPv4 network packet 50, network device 10 may be able to perform the anti-spoof check of the fragment of IPv4 network packet 50 encapsulated by an IPv6 network packet of IPv6 network packets 70 regardless of whether the fragment includes transport header 9 of IPv4 network packet 50.

To perform the anti-spoof check on a fragment of IPv4 network packet 50 based at least in part on source port 16 for IPv4 network packet 50, network device 10 may determine whether the source network address and the source port of IPv4 network packet 50 as specified by the fragment of IPv4 network packet 50 fall within an acceptable range of values. To determine the values of acceptable ranges for the source network address and the source port of IPv4 network packet 50, network device 10 may extract an embedded IPv4 network address and a Port Set Identifier (PSID) from the IPv6 source network address of the IPv6 network packet that encapsulates the fragment of IPv4 network packet 50 based on one or more matching Mapping of Address and Port (MAP) rules. The embedded IPv4 network address and the PSID extracted from the IPv6 source network address of the IPv6 network packet may represent the values of acceptable ranges for the source network address and the source port of a fragment of IPv4 network packet 50 encapsulated within an IPv6 network packet.

Each of fragments 62 of IPv4 network packet 50 includes an indication of the source network address of IPv4 network packet 50 and each of IPv6 network packets 70 that encapsulates fragments 62 of IPv4 network packet 50 includes an indication of source port 16 of IPv4 network packet 50 in flow label 14. Thus, network device 10 may be able to perform an anti-spoof check on each fragment of IPv4 network packet 50 it receives by determining whether both the source network address of IPv4 network packet 50 indicated by the fragment of IPv4 network packet 50 and the source port 16 indicated by the IPv6 network packet that encapsulates the fragment of IPv4 network packet 50 fall within an acceptable range of values.

Thus, network device 10 may determine that a fragment of IPv4 network packet 50 passes the anti-spoof check if the source network address of IPv4 network packet 50 indicated by the fragment of IPv4 network packet 50 matches the embedded IPv4 network address extracted from the IPv6 network packet that encapsulates the fragment of IPv4 network packet 50 and if source port 16 of IPv4 network packet 50 in flow label 14 of the IPv6 network packet that encapsulates the fragment of IPv4 network packet 50 falls within a set of ports specified by the PSID. Conversely, network device 10 may determine that the a fragment of IPv4 network packet 50 fails the anti-spoof check if the source network address of IPv4 network packet 50 indicated by the fragment of IPv4 network packet 50 does not match the embedded IPv4 network address extracted from the IPv6 network packet that encapsulates the fragment of IPv4 network packet 50 or if source port 16 of IPv4 network packet 50 in flow label 14 of the IPv6 network packet that encapsulates the fragment of IPv4 network packet 50 does not fall within a set of ports specified by the PSID.

If network device 10 determines that a fragment of IPv4 network packet 50 passes the anti-spoof check, network device 10 may forward the fragment of IPv4 network packet 50 on to IPv4 network 4 without having to buffer the fragment of IPv4 network packet 50 and without having to reassemble IPv4 network packet 50. Conversely, if network device 10 determines that a fragment of IPv4 network packet 50 does not pass the anti-spoof check, network device 10 may refrain from forwarding the fragment of IPv4 network packet 50 on to IPv4 network 4 and may instead drop the fragment of IPv4 network packet 50. In this way, network device 10 may perform anti-spoof checks on fragments of IPv4 network packet 50 without assembling IPv4 network packet 50 from its fragments and without buffering fragments of IPv4 network packet 50 until network device 10 receives a fragment of IPv4 network packet 50 that includes transport header 9.

Figure 2:
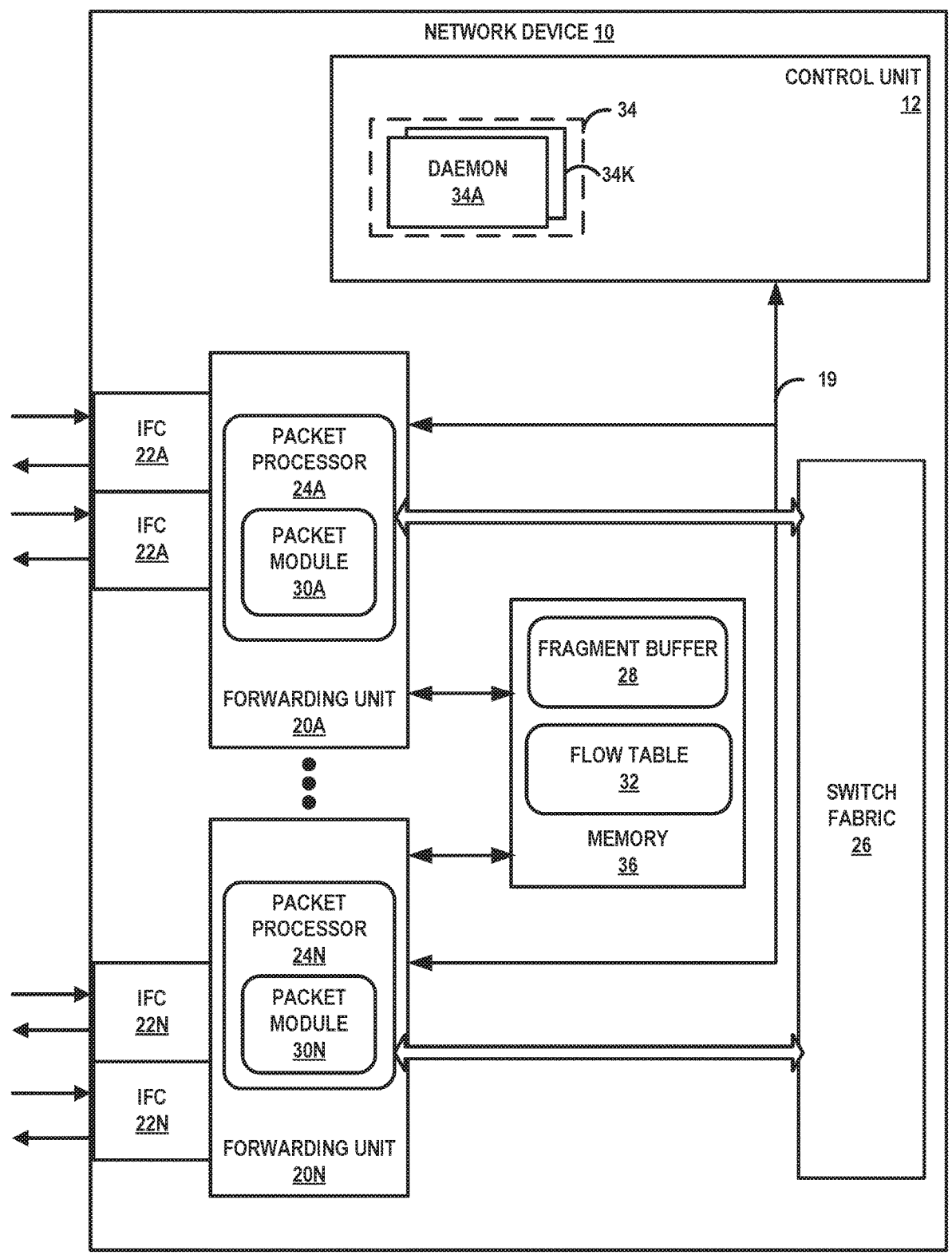
FIG. 2 is a block diagram illustrating an example network device that is configured to perform anti-spoofing checks on fragments of an IPv4 network packet without reassembling the IPv4 network packets from its fragments, where IPv6 network packets encapsulate fragments of the IPv4 network packet, according to techniques described herein.

FIG. 2 is a block diagram illustrating an example network device 10 that is configured to perform anti-spoofing checks on fragments of an IPv4 network packet without reassembling the IPv4 network packets from its fragments, where IPv6 network packets encapsulates fragments of the IPv4 network packet, according to techniques described herein. Network device 10 may include a router such as a provider edge or customer edge router, a core router, or another type of network device, such as a switch. In some examples, network device is a MAP border relay router. In this example, network device 10 includes a control unit 12 that provides control plane functionality for the device. Network device 10 also includes memory 36, a plurality of forwarding units 20A-20N ("forwarding units 20"), and a switch fabric 26 that together provide a data plane for processing network traffic.

Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 19. Internal communication links 19 may include a 100 Mbps Ethernet connection, for instance. Control unit 12 configures, by sending instructions and other configuration data via internal communication link 19, forwarding units 20 to define control processing operations applied to packets received by forwarding units 20.

Control unit 12 executes a plurality of applications, including daemons 34A-34K ("daemons 34"). Each of the applications may represent a separate process managed by a control unit operating system. Daemons 34 may represent user-level processes that are developed and deployed by the manufacturer of the network device 10. As such, daemons 34 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 34 may run network management software, execute routing protocols to communicate with peer routing devices, maintain and update one or more routing tables, and create one or more forwarding tables for installation to forwarding units 20, among other functions.

Control unit 12 may include processing circuitry (not shown in FIG. 2) that execute software instructions, such as those used to define a software or computer program, stored to a computer-readable storage medium, such as memory 36, which may be non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the processing circuitry to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 may be operably coupled to memory 36 that stores fragment buffer 28 and flow table 32 that are shared by the forwarding units of forwarding units 20. Memory 36, fragment buffer 28, and flow table 32 may be external to forwarding units 20, and may reside in the forwarding plane of network device 10 (as shown in FIG. 2), or memory 36, fragment buffer 28, and flow table 32 may be part of control unit 12 in the control plane of network device 10. In some examples, each of forwarding units 20 accesses memory 36 via switch fabric 26, rather than being directly coupled to memory 36 as shown in FIG. 2. In these examples, fragment buffer 28 and flow table 32 are shared across the multiple forwarding units 20, such that each of the packet modules 30 are concurrently accessing the same flow table 32 and a common pool of fragment buffers 28.

Flow table 32 may store information regarding fragments of network packets encountered by network device 10, such as via IFCs 22, and may include entries associated with network packets encountered by network device 10. Each entry in flow table 32 may be associated with a different network packet encountered by network device 10, such that each entry in flow table 32 may contains information about fragments of the network packet associate with the entry in flow table 32.

Fragment buffer 28 may store fragments of network packets, such as fragments of IPv4 network packets on which network device 10 may perform one or more operations. For example, fragment buffer 28 may store fragments received by any of IFCs 22. Similarly, a packet processor such as packet processor 24A of forwarding unit 20A may perform one or more operations on the fragments stored in fragment buffer 28 and may output the fragments stored in fragment buffer 28 via IFC 22A. In some examples, fragment buffer 28 may be reassembly buffers of network device 10 that has typically been used by network device 10 to store fragments of IPv4 network packets that network device 10 may reassemble in order to perform an anti-spoof check on the IPv4 network packet. The techniques disclosed in this disclosure may be able to perform one or more operations on fragments of IPv4 network packets received by network device 10, such as anti-spoof checks, without storing the fragments of IPv4 network packets in fragment buffer 28 and without reassembling an IPv4 network packet from its fragments.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 20 from its input interface on one of IFCs 22 to, at least in some cases, its output interface on one of IFCs 22.

Packet processors 24 include respective packet modules 30A-30N ("packet module 30") that execute at packet processors 24 to receive, via IFCs 22 from IPv6 network 6, IPv6 network packets 70 that encapsulate fragments 62 of IPv4 network packet 50. Each of IPv6 network packets 70 may encapsulate a fragment of IPv4 network packet 50 that is to be forwarded to IPv4 network 4. Packet module 30 may perform an anti-spoof check on each fragment of IPv4 network packet 50 that it receives. If the fragment of IPv4 network packet 50 pass the anti-spoof check, packet module 30 may forward the fragment of IPv4 network packet 50 to IPv4 network 4. If the fragment of IPv4 network packet 50 fails the anti-spoof check, packet module 30 may drop the fragment of IPv4 network packet 50.

Packet module 30 may perform the anti-spoof checks when anti-spoof check is enabled in packet module 30. If anti-spoof check is not enabled, packet module 30 may decapsulate and forward each fragment of IPv4 network packet 50 that it receives to IPv4 network 4 without performing the anti-spoof check.

Packet module 30 may perform an anti-spoof check on a fragment of IPv4 network packet 50 based at least in part on the IPv4 source network address of IPv4 network packet 50 and the source port of IPv4 network packet 50 indicated by the IPv6 network packet that encapsulates the fragment of IPv4 network packet 50. In particular, packet module may perform an anti-spoof check on the fragment of IPv4 network packet 50 by determining whether the IPv4 source network address and the source port of IPv4 network packet 50 indicated by the IPv6 network packet that encapsulates the fragment of IPv4 network packet 50 are each within a respective acceptable range. If the IPv4 source network address and the source port indicated by the IPv6 network packet that encapsulates the fragment of IPv4 network packet 50 are each within a respective acceptable range, then the fragment of IPv4 network packet 50 passes the anti-spoof check. However, if at least one of the IPv4 source network address or the source port is not within a respective acceptable range, then the fragment of IPv4 network packet 50 fails the anti-spoof check.

To perform the anti-spoof check on a fragment of IPv4 network packet 50 based at least in part on source port 16 for IPv4 network packet 50, network device 10 may determine whether the source network address and the source port of IPv4 network packet 50 as specified by the fragment of IPv4 network packet 50 fall within an acceptable range of values. To determine the values of acceptable ranges for the source network address and the source port of IPv4 network packet 50, packet module 30 may extract an embedded IPv4 network address and a Port Set Identifier (PSID) from the IPv6 source network address of the IPv6 network packet that encapsulates the fragment of IPv4 network packet 50 based on one or more matching Mapping of Address and Port (MAP) rules. The embedded IPv4 network address and the PSID extracted from the IPv6 source network address of the IPv6 network packet may represent the values of acceptable ranges for the source network address and the source port of the fragment of IPv4 network packet 50 encapsulated within an IPv6 network packet.

Each of fragments 62 of IPv4 network packet 50 includes an indication of the source network address of IPv4 network packet 50 and each of IPv6 network packets 70 that encapsulates fragments 62 of IPv4 network packet 50 includes an indication of source port 16 of IPv4 network packet 50 in flow label 14. Thus, packet module 30 may be able to perform an anti-spoof check on each fragment of IPv4 network packet 50 that network device 10 receives by determining whether both the source network address of IPv4 network packet 50 indicated by the fragment of IPv4 network packet 50 and the source port 16 indicated by the IPv6 network packet that encapsulates the fragment of IPv4 network packet 50 fall within an acceptable range of values.

Thus, packet module 30 may determine that a fragment of IPv4 network packet 50 passes the anti-spoof check if the source network address of IPv4 network packet 50 indicated by the fragment of IPv4 network packet 50 matches the embedded IPv4 network address extracted from the IPv6 network packet that encapsulates the fragment of IPv4 network packet 50 and if source port 16 of IPv4 network packet 50 in flow label 14 of the IPv6 network packet that encapsulates the fragment of IPv4 network packet 50 falls within a set of ports specified by the PSID. Conversely, packet module 30 may determine that the a fragment of IPv4 network packet 50 fails the anti-spoof check if the source network address of IPv4 network packet 50 indicated by the fragment of IPv4 network packet 50 does not match the embedded IPv4 network address extracted from the IPv6 network packet that encapsulates the fragment of IPv4 network packet 50 or if source port 16 of IPv4 network packet 50 in flow label 14 of the IPv6 network packet that encapsulates the fragment of IPv4 network packet 50 does not fall within a set of ports specified by the PSID.

If packet module 30 determines that a fragment of IPv4 network packet 50 passes the anti-spoof check, network device 10 may forward the fragment of IPv4 network packet 50 on to IPv4 network 4 via IFCs 22 without having to buffer the fragment of IPv4 network packet 50 and without having to reassemble IPv4 network packet 50. Conversely, if packet module 30 determines that a fragment of IPv4 network packet 50 does not pass the anti-spoof check, network device 10 may refrain from forwarding the fragment of IPv4 network packet 50 on to IPv4 network 4 and may instead drop the fragment of IPv4 network packet 50. In this way, network device 10 may perform anti-spoof checks on fragments of IPv4 network packet 50 without assembling IPv4 network packet 50 from its fragments and without buffering fragments of IPv4 network packet 50 until network device 10 receives a fragment of IPv4 network packet 50 that includes transport header 9.

Figure 3:
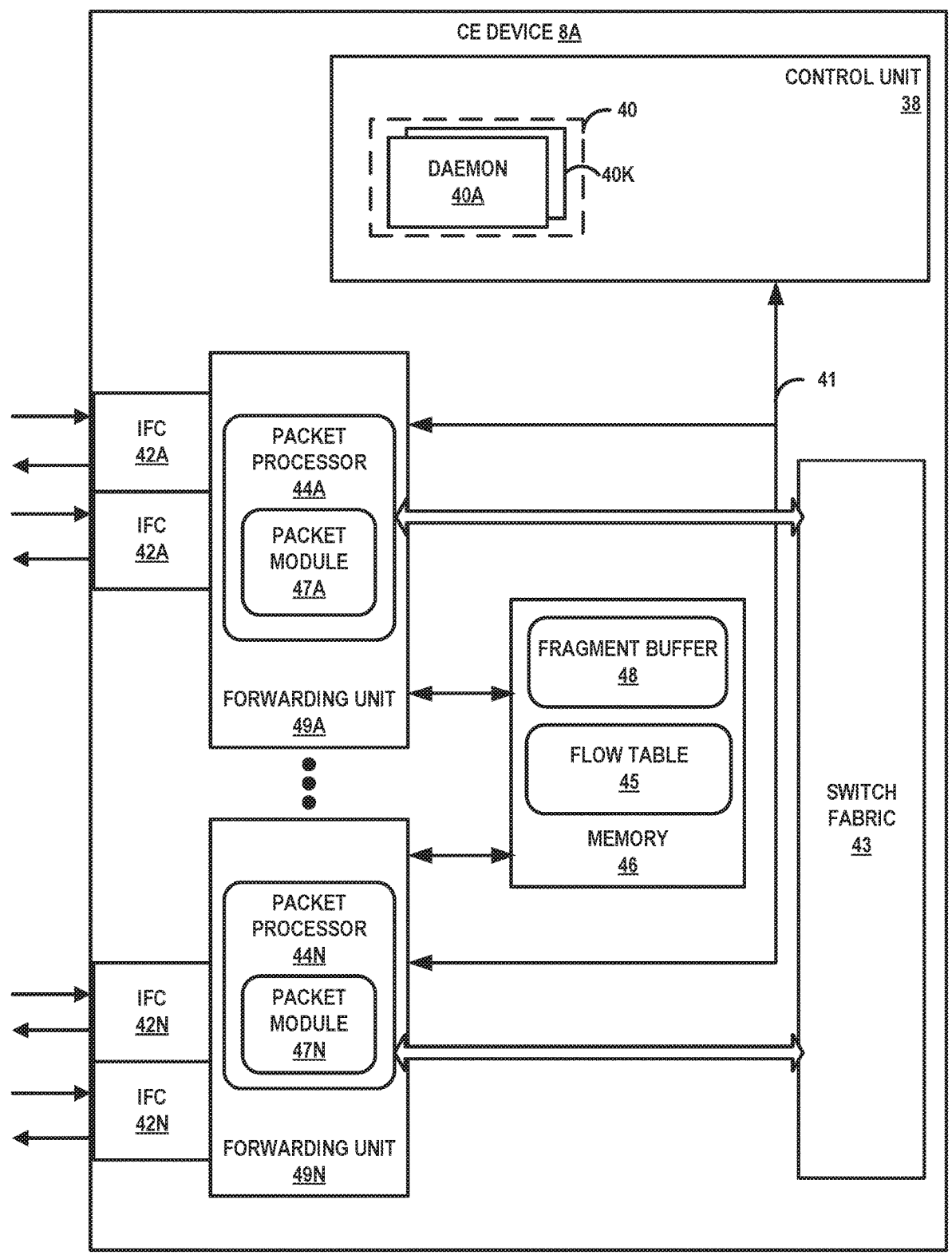
FIG. 3 is a block diagram illustrating an example consumer or customer edge device that is configured to fragment an IPv4 network packet and to encapsulate fragments of the IPv4 network packet in IPv6 network packets, according to techniques described herein.

FIG. 3 is a block diagram illustrating an example consumer edge (CE) device 8A that is configured to fragment an IPv4 network packet and to encapsulate fragments of the IPv4 network packet in IPv6 network packets, according to techniques described herein. In this example, CE device 8A includes a control unit 38 that provides control plane functionality for the device. CE device 8A also includes memory 46, a plurality of forwarding units 49A-49N ("forwarding units 49"), and a switch fabric 43 that together provide a data plane for processing network traffic.

Forwarding units 49 receive and send data packets via interfaces of interface cards 42A-42N ("IFCs 42") each associated with a respective one of forwarding units 49. Each of forwarding units 49 and its associated ones of IFCs 42 may represent a separate line card insertable within a chassis (not shown) of CE device 8A. IFCs 42 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 42 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 49 may include more or fewer IFCs. Switch fabric 43 provides a high-speed interconnect among forwarding units 49 for forwarding incoming data packets to an egress forwarding unit of forwarding units 49 for output over a network that includes network device 10.

Control unit 38 is connected to each of forwarding units 49 by internal communication links 41. Internal communication links 41 may include a 100 Mbps Ethernet connection, for instance. Control unit 38 configures, by sending instructions and other configuration data via internal communication link 41, forwarding units 49 to define control processing operations applied to packets received by forwarding units 49.

Control unit 38 executes a plurality of applications, including daemons 40A-40K ("daemons 40"). Each of the applications may represent a separate process managed by a control unit operating system. Daemons 40 may represent user-level processes that are developed and deployed by the manufacturer of CE device 8A. As such, daemons 40 are "native" to CE device 8A in that the development of the applications is carefully managed by the manufacturer to facilitate secure, robust, and predictable operation of the network device 10, such operation defined at least in part according to a configuration specified by an operator (e.g., a service provider, enterprise, or other customer of CE device 8A's manufacturer). Daemons 40 may run network management software, execute routing protocols to communicate with peer routing devices, maintain and update one or more routing tables, and create one or more forwarding tables for installation to forwarding units 49, among other functions.

Control unit 38 may include processing circuitry (not shown in FIG. 3) that executes software instructions, such as those used to define a software or computer program, stored to a computer-readable storage medium, such as memory 46, which may be non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the processing circuitry to perform techniques described herein. Alternatively, or in addition, control unit 38 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 49 may be operably coupled to memory 46 that stores fragment buffer 48 and flow table 45 that are shared by the forwarding units of forwarding units 49. Memory 46, fragment buffer 48, and flow table 45 may be external to forwarding units 49, and may reside in the forwarding plane of network device 10 (as shown in FIG. 2), or memory 46, fragment buffer 48, and flow table 45 may be part of control unit 38 in the control plane of CE device 8A. In some examples, each of forwarding units 49 accesses memory 46 via switch fabric 43, rather than being directly coupled to memory 46 as shown in FIG. 3. In these examples, fragment buffer 48 and flow table 45 are shared across the multiple forwarding units 49, such that each of the packet modules 47 are concurrently accessing the same flow table 45 and a common pool of fragment buffers 48.

Flow table 45 may store information regarding flows of network packets created or encountered by CE device 8A. For example, flow table 45 may store information regarding a flow of IPv6 network packets 70 that encapsulates fragments 62 of IPv4 network packet 50, such as information regarding flow label 14 of the flow of IPv6 network packets 70, entropy value 18 that are to be included in flow label 14 of the flow of IPv6 network packets 70, and the like.

fragments of network packets encountered by CE device 8A, such as via IFCs 42, and may include entries associated with network packets encountered by network device 10. Each entry in flow table 45 may be associated with a different network packet encountered by CE device 8A, such that each entry in flow table 45 may contains information about fragments of the network packet associate with the entry in flow table 45.

Fragment buffer 48 may store fragments of network packets, such as fragments of IPv4 network packets. For example, CE device 8A may fragment IPv4 network packet 50 that it receives via any of IFCs 42 into fragments 62 and may store fragments 62 of IPv4 network packet 50 into fragment buffer 48 for further processing. For example, CE device 8A may encapsulate such fragments 62 of IPv4 network packet 50 stored fragment buffer 48 according to the techniques described herein.

Each forwarding unit of forwarding units 49 includes at least one packet processor 44 that processes packets by performing a series of operations on each packet over respective internal packet forwarding paths as the packets traverse the internal architecture of network device 10. Packet processor 44A of forwarding unit 49A, for instance, includes one or more configurable hardware chips (e.g., a chipset) that, when configured by applications executing on control unit 38, define the operations to be performed by packets received by forwarding unit 49. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 49 may include one or more packet processors 44.

Operations may be performed, for example, on each packet by any of a corresponding ingress interface, an ingress forwarding unit 49, an egress forwarding unit 49, an egress interface or other components of CE device 8A to which the packet is directed prior to egress, such as one or more service cards. Packet processors 44 process packets to identify packet properties and perform actions bound to the properties. Each of packet processors 44 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 44 of forwarding units 49 from its input interface on one of IFCs 42 to, at least in some cases, its output interface on one of IFCs 42.

Packet processors 44 include respective packet modules 47A-47N ("packet module 47") that execute at packet processors 44 to receive, via IFCs 42 from IPv4 network 3, IPv4 network packet 50. Packet module 47 may execute to fragment IPv4 network packet 50 into fragments 62 and may execute to encapsulate fragments 62 in IPv6 network packets 70.

Because IPv6 network packets 70 encapsulate fragments 62 of the same IPv4 network packet 50, packet module 47 may execute to create flow label 14 for IPv6 network packets 70 to indicate that each of IPv6 network packets 70 are part of the same flow of IPv6 network packets 70. Further, because only one fragment of fragments 62 may include transport header 9 that specifies source port 16 of IPv4 network packet 50, packet module 47 may execute to create flow label 14 for IPv6 network packets 70 that indicates source port 16 of IPv4 network packet 50 whose fragments 62 are encapsulated by IPv6 network packets 70, and may execute to include flow label 14 in each of IPv6 network packets 70.

To create flow label 14 that includes an indication of source port 16 of IPv4 network packet 50, packet module 47 may execute to determine the value of source port 16 for IPv4 network packet 50, such as from transport header 9 of IPv4 network packet 50. Packet module 47 may therefore execute to create flow label 14 to include an indication of source port 16 for IPv4 network packet 50 as well as entropy value 18. Packet module 47 may execute to include entropy value 18 in flow label 14 in order to prevent different flows of network packets from sharing the same flow field, thereby ensuring that different flows of fragments have different flow labels. In some examples, packet module 47 may execute to generate the entropy value by generating a random number as the entropy value.

In some examples, example, if flow label 14 is a 20-bit value, and if the value of source port 16 for IPv4 network packet 50 is a 16-bit value, packet module 47 may execute to generate a 20-bit flow label 14 that includes the 16-bit source port 16 for IPv4 network packet 50 and a 4-bit entropy value 18. Packet module 47 may execute to arrange the bitwise values of source port 16 and entropy value 18 in any suitable arrangement. For example, packet module 47 may execute to create flow label 14 that includes source port 16 as the sixteen most significant bits of flow label 14 and entropy value 18 as the four least significant bits of flow label 14, while in other examples packet module 47 may execute to create flow label 14 that includes source port 16 as the sixteen least significant bits of flow label 14 and entropy value 18 as the four most significant bits of flow label 14. In some examples, packet module 47 may execute to create flow label 14 in which the bits of source port 16 and entropy value 18 are interleaved, such as when the most significant two bits of entropy value 18 are the two most significant bits of flow label 14, followed by sixteen bits of source port 16, followed by the two least significant bits of entropy value 18 as the two least significant bits of flow label 14.

In some examples, packet module 47 may execute to encrypt or otherwise obfuscate the value of source port 16 included in flow label 14. For example, packet module 47 may execute to encrypt source port 16 via any suitable encryption techniques to result in an encrypted source port that packet module 47 may execute to include in flow label 14. In some examples, to encrypt or to obfuscate the value of source port 16, packet module 47 may execute to perform one's complement or two's complement on the value of source port 16 to generate an encrypted source port or an obfuscated source port and may include the resulting value of performing one's complement or two's complement on the value source port 16 in flow label 14 along with entropy value 18.

In this way, packet module 47 may execute to create flow label 14 that indicates source port 16 of IPv4 network packet 50 and is the same for each of IPv6 network packets 70 to identify IPv6 network packets 70 as being part of the same flow of network packets. Because each of IPv6 network packets 70 includes flow label 14 that indicates source port 16 of IPv4 network packet 50 and includes IPv4 header 52 that specifies source address 56 of IPv4 network packet 50, a network device, each respective IPv6 network packet of IPv6 network packets 70 may include or otherwise specify all of the information for performing an anti-spoof check on the respective IPv6 network packet.

CE device 8A may forward IPv6 network packets 70 that encapsulate fragments 62 of IPv4 network packet 50 to network device 10, such as via one or more IFCs 42. For example, in response to encapsulating a fragment 62B of IPv4 network packet 50 in IPv6 network packet 70B, packet module 47 may execute to send IPv6 network packet 70B to network device 10. Network device 10 may receive in IPv6 network packet 70B and may, in response, decapsulate fragment 62B of IPv4 network packet 50 from IPv6 network packet 70B and may perform an anti-spoof check on fragment 62B of IPv4 network packet 50 based at least in part on source port 16 of IPv4 network packet 50 that is indicated by flow label 14 of IPv6 network packet 70.

Figure 4A:
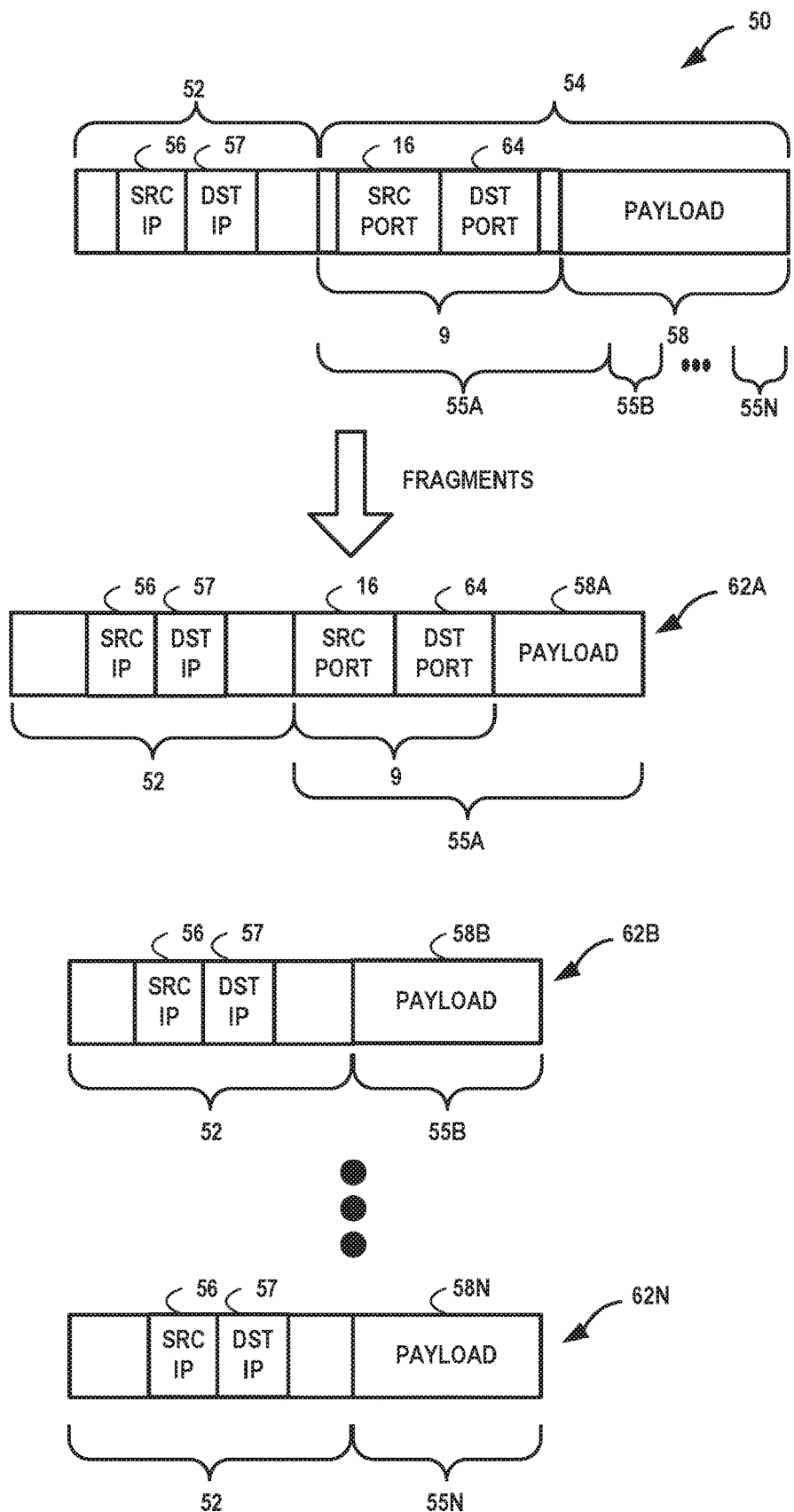
FIGS. 4A and 4B are block diagrams illustrating an example IPv4 network packet that is fragmented into example fragments and example IPv6 network packets that encapsulate the example fragments of the example IPv4 network packet, according to the techniques described herein.
Figure 4B:
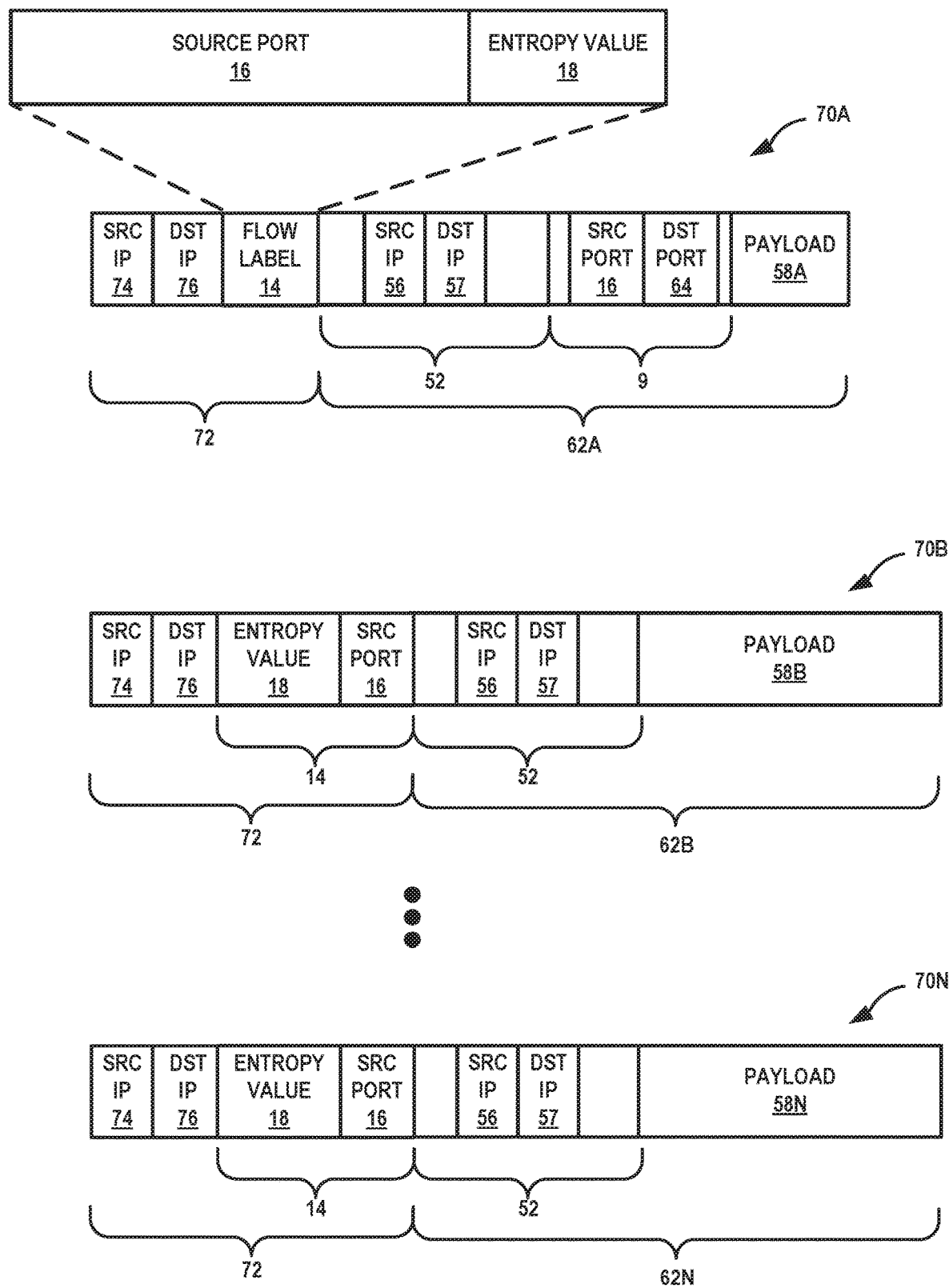

FIGS. 4A and 4B are block diagrams illustrating an example IPv4 network packet that is fragmented into example fragments and example IPv6 network packets that encapsulate the example fragments of the example IPv4 network packet, according to the techniques described herein. A CE device, such as CE device 8A, may receive an IPv4 network packet, such as IPv4 network packet 50, from an IPv4 host device, such as IPv4 host device 5. CE device 8A may determine whether to encapsulate IPv4 network packet 50 within an IPv4 network packet in order to transmit IPv4 network packet 50 via an IPv6 network, such as IPv6 network 6 based at least in part on determining whether an IPv6 network packet that encapsulates IPv4 network packet 50 is larger than a maximum transmission unit (MTU) for IPv6 network 6. If CE device 8A determines that the IPv6 network packet that encapsulates IPv4 network packet 50 is larger than the MTU for IPv6 network 6, CE device 8A may fragment IPv4 network packet 50 into fragments 62A-62N, encapsulate the fragments 62A-62N in IPv6 network packets 70A-70N, and transmit the IPv6 network packets 70A-70N via IPv6 network 6 to, for example, network device 10.

Network device 10 may receive, from CE device 8A via IPv6 network 6, IPv6 network packets 70A-70N that encapsulate fragments 62A-62N of IPv4 network packet 50. Network device 10 may decapsulate the fragments 62 of IPv4 network packet 50 from the IPv6 network packets and may perform anti-spoof checks on the decapsulated fragments 62A-62N of IPv4 network packet 50.

As shown in FIG. 4A, IPv4 network packet 50 may include header 52 followed by data section 54. Header 52 may include fields that specifies various information regarding IPv4 network packet 50. In the example of FIG. 4A, header 52 may include fields that specify source address 56 of IPv4 network packet 50 and destination address 57 of IPv4 network packet 50. Source address 56 of IPv4 network packet 50 may be the IPv4 address of the sender of IPv4 network packet 50. Destination address 57 of IPv4 network packet 50 may be the IPv4 address of the receiver of IPv4 network packet 50. Header 52 may include additional fields not shown in FIG. 4A, such as a protocol field that specifies the protocol used in data section 54 of IPv4 network packet 50, such as Transmission Control Protocol (TCP) or User Datagram Protocol (UDP). For example, header 52 may include a total of fourteen fields, thirteen of which are required.

Data section 54 of IPv4 network packet 50 may include data associated with the transport layer protocol, such as TCP, UDP, and the like, utilized to transport IPv4 network packet 50 across networks such as IPv6 network 6. Data section 54 of IPv4 network packet 50 may include transport header 9 followed by payload 58. Transport header 9 may be a TCP header, UDP header, and the like depending on the transport layer protocol used to transport IPv4 network packet 50. Transport header 9 may include a field that specifies source port 16 of IPv4 network packet 50 and a field that specifies destination port 64 of IPv4 network packet 50. Source port 16 may be the sending port of the sender of IPv4 network packet 50, and destination port 64 may be the destination port of the receiver of IPv4 network packet 50. Transport header 9 may include additional fields that specify additional information not shown in FIG. 4A. Payload 58 of IPv4 network packet 50 may be data carried by IPv4 network packet 50 besides header 52 and transport header 9.

CE device 8A may fragment IPv4 network packet 50 by dividing data section 54 of IPv4 network packet 50 into sequential data section fragments 55A-55N ("data section fragments 55"), which are sequential non-overlapping portions of data section 54 of IPv4 network packet 50. Data section fragment 55A may include a sequentially first portion of data section 54, including transport header 9 and a first portion of payload 58. Data section fragment 55N may include the sequentially last non-overlapping portion of payload 58. One or more data section fragments, such as data section fragment 55B, may each contain a non-overlapping portion of payload 58 between the portions of payload 58 contained in data section fragment 55A and data section fragment 55N. As can be seen, only data section fragment 55A contains transport header 9, while none of the remaining data section fragments 55B-55N contains transport header 9.

CE device 8A may generate fragments 62A-62N ("fragments 62") of IPv4 network packet 50 that each contains IPv4 header 52 and one of data section fragments 55. CE device 8A may encapsulate fragments 62 into IPv6 network packets, so that CE device 8A may encapsulate each fragment of fragments 62 within a separate IPv6 network packet. Thus, if fragments 62 includes a total of five fragments, network device 10 may encapsulate the five fragments within five IPv6 network packets that each contain one of the five fragments.

In accordance with aspects of the present disclosure, CE device 8A may encapsulate fragments 62 within IPv6 network packets to result in IPv6 network packets 70 that each include an indication of source port 16 of IPv4 network packet 50. As shown in FIG. 4B, CE device 8A may perform MAP-E to encapsulate fragments 62 within IPv6 network packets. In particular, CE device 8A may encapsulate fragment 62A within IPv6 network packet 70A, encapsulate fragment 62B within IPv6 network packet 70B, encapsulate fragment 62N within IPv6 network packet 70N, and so on. An IPv6 network packet includes IPv6 header 72 and a payload (e.g., one of fragments 62). Thus, IPv6 network packet 70A includes IPv6 header 72 and fragment 62A, IPv6 network packet 70B includes IPv6 header 72 and fragment 62B, and IPv6 network packet 70C includes IPv6 header 72 and fragment 62C.

IPv6 header 72 may include fields that specify IPv6 source address 74 and IPv6 destination address 76. IPv6 source address 74 specifies the IPv6 address of the sender of the IPv6 network packet. IPv6 destination address 76 specifies the IPv6 address of the receiver of the IPv6 network packet. It should be understood that IPv6 header 72 may include additional fields that specify additional information that are not shown in FIG. 4B.

To perform MAP-E to encapsulate fragments 62 within IPv6 network packets 70, CE device 8A may generate IPv6 network header 72 that specifies IPv6 source address 74 and IPv6 destination address 76, based at least in part on fragments 62. CE devices 8 and network device 8 use an address plus port technique for packet routing, where the source address 56 specified by IPv4 network packet 50 is extended by at least a portion of the source port 16 specified by IPv4 network packet 50, and the destination addresses 57 specified by IPv4 network packet 50 is extended by at least a portion of the destination port 64 specified by IPv4 network packet 50. Thus, CE device 8A may generate IPv6 source address 74 based at least in part on source address 56 specified by IPv4 network packet 50 source port 16 specified by IPv4 network packet 50. Similarly, CE device 8A may generate IPv6 destination address 76 based at least in part on destination addresses 57 specified by IPv4 network packet 50 and destination port 64 specified by IPv4 network packet 50.

IPv6 header 72 of each of IPv6 network packets 70 may also include flow label 14 that identifies the flow of network packets to which IPv6 network packets 70 belong. Because IPv6 network packets 70 carry fragments 62 of the same IPv4 network packet 50, CE device 8A may identify IPv6 network packets 70 as belonging to the same flow of network packets by creating flow label 14 that is the same for each of IPv6 network packets 70 and by including flow label 14 in IPv6 header 72 of each of IPv6 network packets 70.

CE device 8A may create flow label 14 for each of IPv6 network packets 70 that indicates source port 16 of IPv4 network packet 50, so that each of IPv6 network packets 70 includes an indication of source port 16 of IPv4 network packet 50. In some examples, CE device 8A may create flow label 14 that indicates source port 16 of IPv4 network packet 50 by creating flow label 14 that includes source port 16 of IPv4 network packet 50. Further, to prevent two unrelated flows of network packets from having the same flow label, such as two unrelated flows of IPv6 network packets that encapsulate fragments of IPv4 network packets having the same source port, CE device 8A may include entropy value 18 in flow label 14 along with an indication of source port 16, where entropy value 18 may be a bitwise representation of a random number that is determined by CE device 8A.

In some examples, flow label 14 may be a 20-bit field, and source port 16 may be a 16-bit value. As such, CE device 8A may create flow label 14 that includes the 16-bit value of source port 16 as well as 4 bits of entropy value 18. In some examples, CE device 8A may create flow label 14 that includes source port 16 as the sixteen most significant bits of flow label 14 and entropy value 18 as the four least significant bits of flow label 14, while in other examples CE device 8A may create flow label 14 that includes source port 16 as the sixteen least significant bits of flow label 14 and entropy value 18 as the four most significant bits of flow label 14. CE device 8A may also arrange source port 16 and entropy value 18 in any other fashion in the 20-bit flow label 14, such as by interleaving the bits of source port 16 with entropy value 18 in any appropriate fashion. For example, CE device 8A may create flow label 14 where the most significant two bits of entropy value 18 are the two most significant bits of flow label 14, followed by sixteen bits of source port 16, followed by the two least significant bits of entropy value 18 as the two least significant bits of flow label 14.

In some examples, CE device 8A may encrypt or otherwise obfuscate the value of source port 16 included in flow label 14. For example, CE device 8A may encrypt source port 16 via any suitable encryption techniques to result in an encrypted source port that CE device 8A may include in flow label 14. In some examples, to encrypt or to obfuscate the value of source port 16, CE device 8A may perform one's complement or two's complement on the value of source port 16 and may include the resulting value of source port 16 in flow label 14 along with entropy value 18.

In this way, CE device 8A may create flow label 14 that indicates source port 16 of IPv4 network packet 50 and is the same for each of IPv6 network packets 70 to identify IPv6 network packets 70 as being part of the same flow of network packets. Because each of IPv6 network packets 70 includes flow label 14 that indicates source port 16 of IPv4 network packet 50 and includes IPv4 header 52 that specifies source address 56 of IPv4 network packet 50, a network device, each respective IPv6 network packet of IPv6 network packets 70 may include or otherwise specify all of the information for performing an anti-spoof check on the respective IPv6 network packet.

CE device 8A may forward IPv6 network packets 70 that encapsulate fragments 62 of IPv4 network packet 50 to network device 10. For example, in response to encapsulating a fragment 62B of IPv4 network packet 50 in IPv6 network packet 70B, CE device 8A may send IPv6 network packet 70B to network device 10. Network device 10 may receive in IPv6 network packet 70B and may, in response, decapsulate fragment 62B of IPv4 network packet 50 from IPv6 network packet 70B and may perform an anti-spoof check on fragment 62B of IPv4 network packet 50 based at least in part on source port 16 of IPv4 network packet 50 that is indicated by flow label 14 of IPv6 network packet 70.

Note that even though fragment 62B of IPv4 network packet 50 encapsulated by IPv6 network packet 70B does not include source port 16 for IPv4 network packet 50 because fragment 62B of IPv4 network packet 50 does not include transport header 9, network device 10 is still able to perform an anti-spoof check on fragment 62B of IPv4 network packet 50 encapsulated in IPv6 network packet 70B because IPv6 network packet 70B includes flow label 14 that indicates source port 16 of IPv4 network packet 50. Thus, even if network device 10 has yet to receive IPv6 network packet 70A that includes transport header 9 of IPv4 network packet 50 prior to receiving IPv6 network packet 70B that does not include transport header 9 of IPv4 network packet 50, network device 10 may still be able to perform an anti-spoof check on fragment 62B of IPv4 network packet 50 encapsulated by IPv6 network packet 70B based on the information contained within IPv6 network packet 70B.

Network device 10 may determine whether fragment 62B of IPv4 network packet 50 passes the anti-spoof check and may, based on fragment 62B of IPv4 network packet 50 passing the anti-spoof check, forward fragment 62B of IPv4 network packet 50 on to IPv4 network 4. Conversely, if network device 10 determines that fragment 62B of IPv4 network packet 50 failed the anti-spoof check, network device 10 may refrain from forwarding fragment 62B of IPv4 network packet 50 on to IPv4 network 4 and may instead drop fragment 62B of IPv4 network packet 50.

Network device 10 may continue to receive one or more additional IPv6 network packets 70 that encapsulates one or more fragments 62 of IPv4 network packet 50 until it has received every one of IPv6 network packets 70. Network device 10 may, in response to receiving each respective IPv6 network packet of the one or more additional IPv6 network packets 70, decapsulate a respective fragment of IPv4 network packet 50 from each respective IPv6 network packet of the one or more additional IPv6 network packets 70, and perform an anti-spoof check on the respective fragment of IPv4 network packet 50 based at least in part on source port 16 for IPv4 network packet 50 that is indicated by a respective flow label 14 of the respective IPv6 network packet.

Network device 10 may determine whether each respective fragment of IPv4 network packet 50 passes the anti-spoof check and may, based on the respective fragment of IPv4 network packet 50 passing the anti-spoof check, forward the respective fragment of IPv4 network packet 50 on to IPv4 network 4. Conversely, if network device 10 determines that the respective fragment of network packet 50 failed the anti-spoof check, network device 10 may refrain from forwarding the respective fragment of IPv4 network packet 50 on to IPv4 network 4 and may instead drop the respective fragment of IPv4 network packet 50.

FIG. 5 is a flowchart illustrating an example process for performing an anti-spoof check on fragments of an IPv4 network packet without buffering fragments of the IPv4 network packet and without reassembling the IPv4 network packet, according to techniques described herein. The techniques illustrated in FIG. 5 are described with respect to FIGS. 1-3 and FIGS. 4A-4B.

As shown in FIG. 5, network device 10 may receive, from a first network (e.g., IPv6 network 6), a network packet of a first network packet type (e.g., IPv6 network packet 70B) that encapsulates a fragment of a second network packet of a second network packet type (e.g., fragment 62B of IPv4 network packet 50), wherein the network packet is part of a flow of a plurality of network packets of the first network packet type that encapsulates fragments of the second network packet, and wherein the network packet includes a flow label (e.g., flow label 14) that indicates a source port (e.g., source port 16) for the network packet (502). Network device 10 may, in response to receiving the network packet, perform an anti-spoof check on the fragment of the second network packet based at least in part on the source port, for the second network packet that is indicated by the flow label of the network packet (504).

Network device 10 may, based on the fragment of the second network packet passing the anti-spoof check, forward the fragment of the second network packet to a second network (506). In some examples, the first network is an Internet Protocol version 6 (IPv6) network 6, the second network is an Internet Protocol version 4 (IPv4) network 4, the network packet of the first network packet type is an IPv6 network packet, such as one of IPv6 network packets 60, and the second network packet of the second network packet type is an IPv4 network packet, such as IPv4 network packet 50.

In some examples, network device 10 has not received any fragments of the second network packet that includes an indication of the source port for the second network packet, and the fragment of the second network packet encapsulated by the network packet does not include the indication of the source port for the second network packet.

In some examples, network device 10 may receive one or more additional network packets of the flow of the plurality of network packets that encapsulate one or more fragments of the second network packet. Network device 10 may, in response to receiving each respective network packet of the one or more additional network packets, perform the anti-spoof check on a respective fragment of the second network packet encapsulated by the respective network packet based at least in part on the source port for the second network packet that is indicated by a respective flow label of the respective network packet. Network device 10 may, based on the respective fragment of the second network packet passing the anti-spoof check, forwarding, by the network device, the respective fragment of the second network packet to the second network.

In some examples, the flow label comprises an indication of the source port for the second network packet and an entropy value. In some examples, the flow label comprises an encrypted source port, and network device 10 may perform the anti-spoof check on the fragment of the second network packet based at least in part on the source port for the second network packet that is indicated by the flow label of the network packet by decrypting the encrypted source port to determine the source port for the second network packet.

Figure 6:
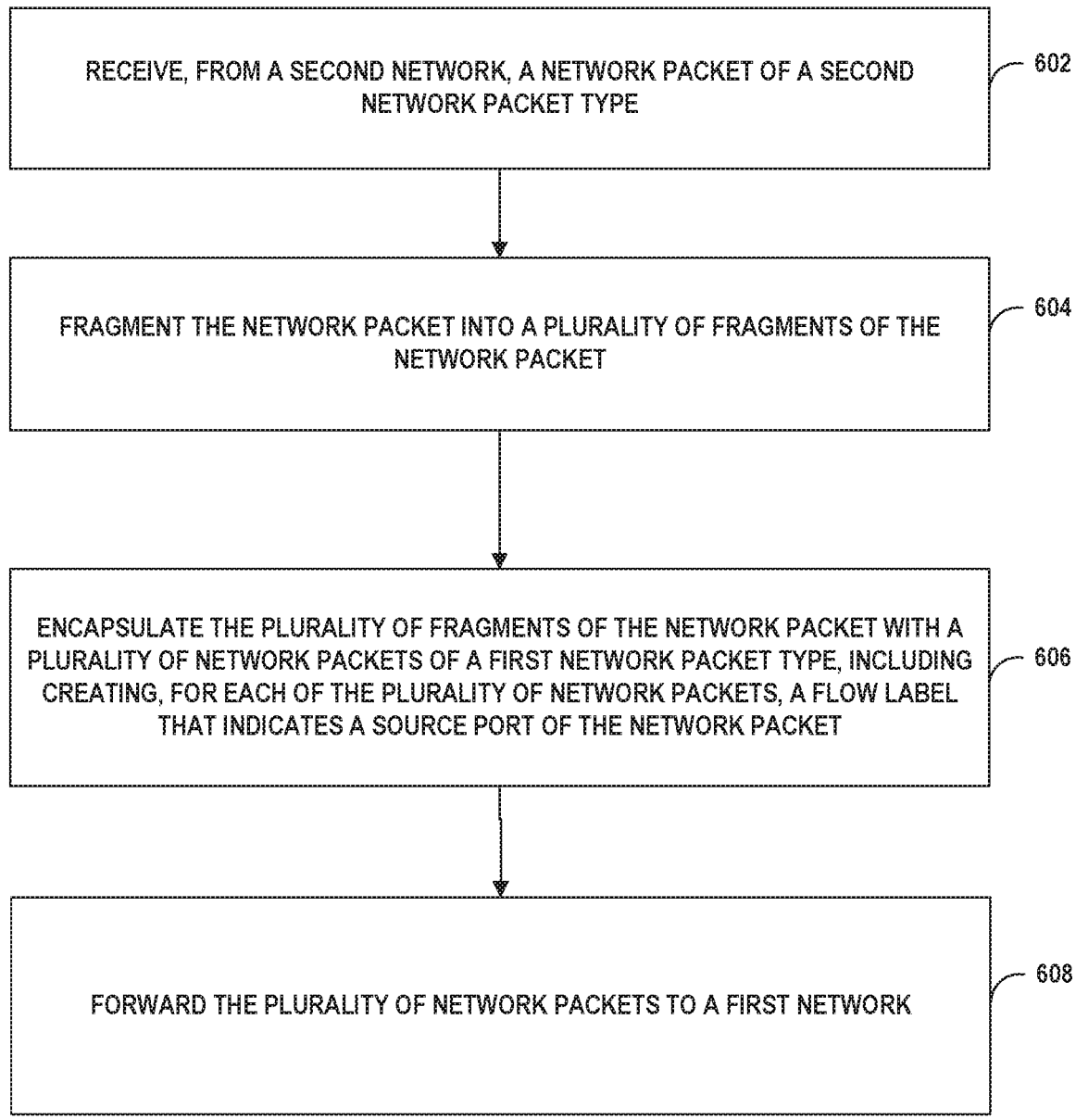
FIG. 6 is a flowchart illustrating an example process for encapsulating fragments of an IPv4 network packet within IPv6 network packets that each include a flow label that indicates the source port for the IPv4 network packet, according to techniques described herein.

FIG. 6 is a flowchart illustrating an example process for encapsulating fragments of an IPv4 network packet within IPv6 network packets that each include a flow label that indicates the source port for the IPv4 network packet, according to techniques described herein. The techniques illustrated in FIG. 6 are described with respect to FIGS. 1-3 and FIGS. 4A-4B.

As shown in FIG. 6, a network device such as CE device 8A may receive, from a second network (e.g., IPv4 network 3), a network packet of a second network packet type (e.g., IPv4 network packet 50) (602). CE device 8A may fragment the network packet into a plurality of fragments of the network packet (e.g., fragments 62) (604). CE device 8A may encapsulate the plurality of fragments of the network packet with a plurality of network packets of a first network packet type (e.g., IPv6 network packets 70), including creating, for each of the plurality of network packets, a flow label (e.g., flow label 14) that indicates a source port (e.g., source port 16) of the network packet (606). In some examples, to create, for each of the plurality of network packets, the flow label that indicates the source port of the network packet CE device 8A may create the flow label that includes an entropy value (e.g., entropy value 18) and an indication of the source port of the network packet.

In some examples, to create, for each of the plurality of network packets, the flow label that indicates the source port of the network packet CE device 8A may encrypt the source port of the network packet to generate an encrypted source port of the network packet and may create, for each of the plurality of network packets, the flow label that includes the encrypted source port. In some examples, to create, for each of the plurality of network packets, the flow label that indicates the source port of the network packet CE device 8A may create, for each of the plurality of network packets, the flow label that includes an entropy value.

CE device 8A may forward the plurality of network packets to a first network (608). Each of the plurality of network packets includes the same flow label that identifies the plurality of network packets as belonging to the same flow of network packets. In some examples, the first network is an Internet Protocol version 6 (IPv6) network such as IPv6 network 6, the second network is an Internet Protocol version 4 (IPv4) network such as IPv4 network 4, the plurality of network packets of the first network packet type is a plurality of IPv6 network packets such as IPv6 network packets 70, and the network packet of the second network packet type is an IPv4 network packet such as IPv4 network packet 50, and The techniques described in this disclosure may be implemented, at least in part, in hardware, software, firmware or any combination thereof. For example, various aspects of the described techniques may be implemented within processing circuitry, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
receiving, by a network device from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that comprises an indication of a source port for the second network packet and an entropy value;
in response to receiving the network packet, performing, by the network device, an anti-spoof check on the fragment of the second network packet based at least in part on the source port for the second network packet that is indicated by the flow label; and
based on the fragment of the second network packet passing the anti-spoof check, forwarding, by the network device, the fragment of the second network packet to a second network.

2. The method of claim 1, wherein:
the network device has not received any fragments of the second network packet that includes an indication of the source port for the second network packet; and
the fragment of the second network packet encapsulated by the network packet does not include the indication of the source port for the second network packet.

3. The method of claim 1, further comprising:
receiving, by the network device, one or more additional network packets of the flow of the plurality of network packets that encapsulate one or more fragments of the second network packet;
in response to receiving each respective network packet of the one or more additional network packets, performing, by the network device, a respective anti-spoof check on a respective fragment of the second network packet encapsulated by the respective network packet based at least in part on the source port for the second network packet that is indicated by a respective flow label of the respective network packet; and
based on the respective fragment of the second network packet passing the respective anti-spoof check, forwarding, by the network device, the respective fragment of the second network packet to the second network.

4. The method of claim 1, wherein the flow label comprises an encrypted source port, further comprising:
decrypting, by the network device, the encrypted source port to determine the source port for the second network packet.

5. The method of claim 1, wherein:
the first network is an Internet Protocol version 6 (IPv6) network;
the second network is an Internet Protocol version 4 (IPv4) network;
the network packet of the first network packet type is an IPv6 network packet; and
the second network packet of the second network packet type is an IPv4 network packet.

6. A network device comprising:
one or more network interfaces configured to receive, from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that comprises an indication of a source port for the second network packet and an entropy value; and
processing circuitry configured to:
in response to receiving the network packet, perform an anti-spoof check on the fragment of the second network packet based at least in part on the source port for the second network packet that is indicated by the flow label;
wherein the one or more network interfaces are further configured to, based on the fragment of the second network packet passing the anti-spoof check, forward the fragment of the second network packet to a second network.

7. The network device of claim 6, wherein:
the network device has not received any fragments of the second network packet that includes an indication of the source port for the second network packet; and
the fragment of the second network packet encapsulated by the network packet does not include the indication of the source port for the second network packet.

8. The network device of claim 6, wherein:
the one or more network interfaces are further configured to receive one or more additional network packets of the flow of the plurality of network packets that encapsulate one or more fragments of the second network packet;
the processing circuitry is further configured to, in response to receiving each respective network packet of the one or more additional network packets, perform a respective anti-spoof check on a respective fragment of the second network packet encapsulated by the respective network packet based at least in part on the source port for the second network packet that is indicated by a respective flow label of the respective network packet; and
the one or more network interfaces are further configured to, based on the respective fragment of the second network packet passing the respective anti-spoof check, forward the respective fragment of the second network packet to the second network.

9. The network device of claim 6, wherein:
the flow label comprises an encrypted source port; and
the processing circuitry is further configured to decrypt the encrypted source port to determine the source port for the second network packet.

10. The network device of claim 6, wherein:
the first network is an Internet Protocol version 6 (IPv6) network;
the second network is an Internet Protocol version 4 (IPv4) network;
the network packet of the first network packet type is an IPv6 network packet; and
the second network packet of the second network packet type is an IPv4 network packet.

11. A method comprising:
receiving, by a network device from a second network, a network packet of a second network packet type;
fragmenting, by the network device, the network packet into a plurality of fragments of the network packet;
encapsulating, by the network device, the plurality of fragments of the network packet with a plurality of network packets of a first network packet type, including creating, for each of the plurality of network packets, a flow label that includes an entropy value and an indication of a source port of the network packet; and forwarding, by the network device, the plurality of network packets to a first network.

12. The method of claim 11, wherein creating, for each of the plurality of network packets, the flow label that indicates includes the entropy value and the indication of the source port of the network packet comprises:
encrypting, by the network device, the source port of the network packet to generate an encrypted source port of the network packet; and
creating, by the network device, for each of the plurality of network packets, the flow label that includes the encrypted source port.

13. The method of claim 11, wherein:
the first network is an Internet Protocol version 6 (IPv6) network;
the second network is an Internet Protocol version 4 (IPv4) network;
the plurality of network packets of the first network packet type is a plurality of IPv6 network packets; and
the network packet of the second network packet type is an IPv4 network packet.

14. A network device comprising:
one or more network interfaces configured to receive, from a second network, a network packet of a second network packet type; and
processing circuitry configured to:
fragment the network packet into a plurality of fragments of the network packet; and
encapsulate the plurality of fragments of the network packet with a plurality of network packets of a first network packet type, including creating, for each of the plurality of network packets, a flow label that includes an entropy value and includes an indication of a source port of the network packet;
wherein the one or more network interfaces are further configured to forward the plurality of network packets to a first network.

15. The network device of claim 14, wherein to create, for each of the plurality of network packets, the flow label that indicates includes the entropy value and includes the indication of the source port of the network packet, the processing circuitry is further configured to:
encrypt the source port of the network packet to generate an encrypted source port of the network packet; and
create, for each of the plurality of network packets, the flow label that includes the encrypted source port.

16. The network device of claim 14, wherein:
the first network is an Internet Protocol version 6 (IPv6) network;
the second network is an Internet Protocol version 4 (IPv4) network;
the plurality of network packets of the first network packet type is a plurality of IPv6 network packets; and
the network packet of the second network packet type is an IPv4 network packet.

* * * * *